United States Patent

[11] 3,578,248

| [72] | Inventors | George L. Congdon |
|---|---|---|
| | | Fort Atkinson; |
| | | Fred W. Kufrin, Janesville, Wis. |
| [21] | Appl. No. | 842,124 |
| [22] | Filed | July 16, 1969 |
| [45] | Patented | May 11, 1971 |
| [73] | Assignee | Western Industries, Inc. |
| | | Milwaukee, Wis. |

[54] FLUID SPRINKLER HAVING MEANS FOR DRIVING AND REVERSING AN OSCILLATING DISTRIBUTING TUBE OF UNIFORM SPEED
6 Claims, 6 Drawing Figs.

| [52] | U.S. Cl. | 239/242 |
|---|---|---|
| [51] | Int. Cl. | B05b 3/16 |
| [50] | Field of Search | 239/102, 240, 242, 206 |

[56] References Cited
UNITED STATES PATENTS

| 1,187,373 | 6/1916 | Nomiya | 239/242 |
|---|---|---|---|
| 1,864,892 | 6/1932 | Coles et al. | 239/206 |
| 3,405,871 | 10/1968 | Mullan | 239/242 |
| 3,432,102 | 3/1969 | Turner | 239/242 |

Primary Examiner—M. Henson Wood, Jr.
Assistant Examiner—Edwin D. Grant
Attorney—James E. Nilles ABSTRACT: A fluid sprinkler having an oscillating water tube that moves with a uniform velocity through an arc of adjustable length, including a fluid turbine connected to the distributing tube for oscillating the tube of a uniform velocity and depositing a predetermined amount of water per unit area of ground regardless of water pressure or the length of oscillatory swinging movement of the water tube. The means for oscillating the tube includes a directional flow valve means connected to the tube for instantly reversing the direction of swing of the tube.

Patented May 11, 1971

INVENTORS:
G.L. CONGDON
F.N. KUFRIN

BY: James E. Nilles
ATTORNEY

Patented May 11, 1971

INVENTORS:
G. L. CONGDON
F. W. KUFRIN
BY:
James E. Nilles
ATTORNEY

3,578,248

FLUID SPRINKLER HAVING MEANS FOR DRIVING AND REVERSING AN OSCILLATING DISTRIBUTING TUBE OF UNIFORM SPEED

BACKGROUND OF THE INVENTION

Water sprinkler devices of the oscillating nozzle or water tube type have heretofore been known, and they act to cause the water-distributing tube to oscillate and thereby distribute water over a given area. It is also conventional to provide adjustable stops so as to define the limits through which the water tube oscillates and thereby adjust or define the area of the ground to be covered.

Prior art devices have not been entirely satisfactory for a number of reasons; the amount of water distributed by some of them may vary with the pressure of the water; other types shut off when a given volume of water passes through a meter; in other of these prior art devices, a crank arm is used to impart the oscillating movement to the water-distributing tube, and the rate of coverage of the ground is inversely proportional to the area of the ground which is covered; usually these crank arms were adjustable in length so as to vary the speed or travel of the oscillating water tube and thereby the rate of depositing water on the ground over a given area varied considerably.

Furthermore, some of these prior art sprinklers had complicated and costly drive mechanisms subject to malfunction and requiring considerable repair and maintenance.

SUMMARY OF THE INVENTION

The present invention provides a lawn sprinkler having an oscillating water-distributing nozzle or tube which is driven at a uniform angular velocity through an arc which is determined by settable stops. The sprinkler water tube has an oscillating movement of constant velocity and the amount of water distributed on any area is uniform; the rate of coverage, that is the amount of water per oscillation remains constant even though the dimensions of the ground area to be covered are changed by moving the settable stops.

Generally, the invention provides a fluid sprinkler of the oscillating type which overcomes the disadvantages of prior art sprinklers, which provides a drive mechanism of greatly simplified construction for oscillating the distributing tube, and in which the distributing tube is driven by a turbine wheel and the turbine wheel in turn is reversed in its direction by a flow directional valve that is actuated by the distributing tube.

These and other objects and advantages of the invention will become apparent from the following detailed description.

THE DRAWINGS

A clear conception of the several features constituting the invention and of the construction and mode of operation of a typical oscillatory lawn sprinkler embodying the invention will be had by referring to the drawings accompanying and forming a part of this specification wherein like reference characters are used to identify the same or similar parts in the various views.

DETAILED DESCRIPTION

Figure 1:
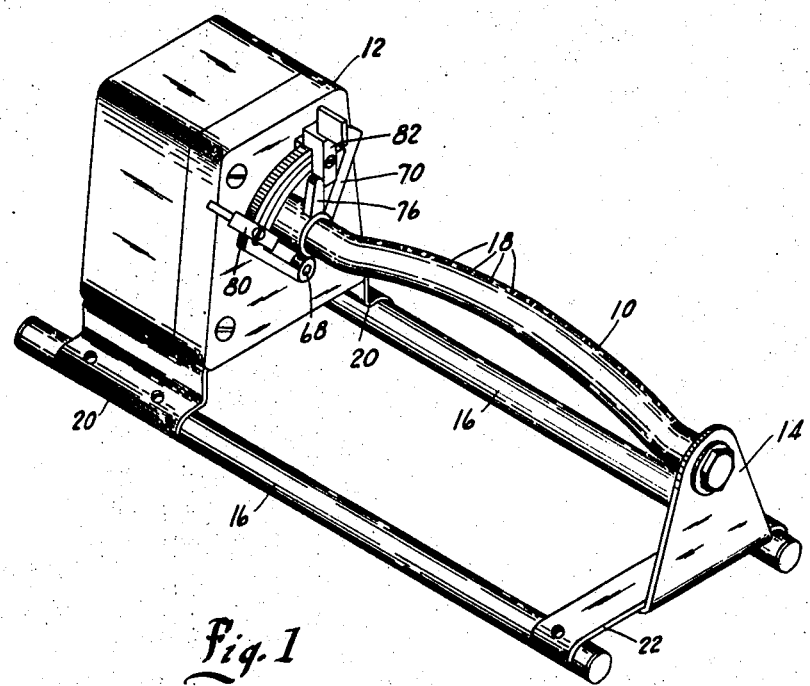
FIG. 1 is a perspective view, of a typical oscillatory type lawn sprinkler embodying the present invention.
Figure 2:
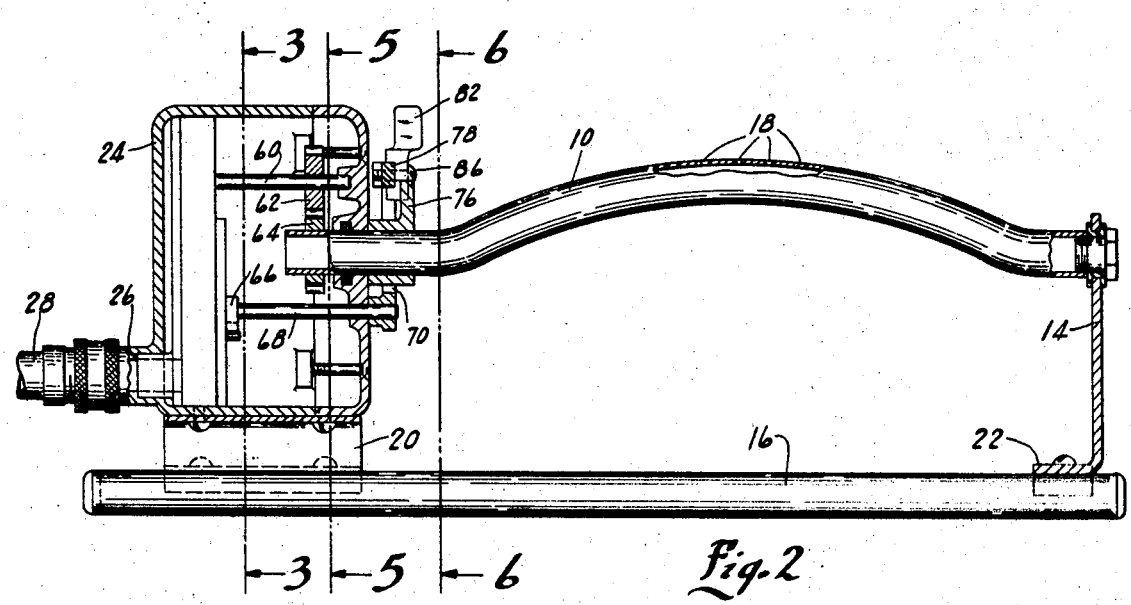
FIG. 2 is a part sectional elevational view of the sprinkler.

Referring to the drawings, the lawn sprinkler shown therein as embodying the present invention comprises, in general, a fluid-distributing tube 10 mounted for rotation between the fluid motor 12 and an upstanding bracket 14 both secured to a pair of supporting feet 16 in a suitable manner.

The fluid-distributing tube 10 is provided with a plurality of discharge apertures 18 and preferably has the intermediate portion thereof curved as shown so that the curved portion will oscillate upon rotation of the tube alternately in opposite directions. The fluid motor 12 may be secured to the feet 16 as by means of suitable depending legs 20, and the upstanding bracket 14 may be secured to the feet 16 as by means of a flange or plate 22.

The drive motor is shown in detail in FIGS. 2 to 5 inclusive, and this motor consists of a housing 24 having an inlet 26 for water which may be admitted by way of a hose 28 at local service pressure. The water entering the inlet 26 is conducted to passageway or conduit 30, as in FIG. 3, the conduit 30 narrowing or converging from the water inlet to the intermediate portion 32 thereof and then widening or diverging in portion 34. Accordingly, a convergent-divergent nozzle is formed by the conduit 30, 32, 34, and a low pressure point is formed at 32.

The nozzle thus formed also includes a generally conical flow divider 36 within the diverging portion 34, and the divergent walls cooperate with the flow divider 36 to form outflow or discharge ports 38, 40 which open to an annular chamber 42. The chamber 42 houses a rotatable turbine wheel 44 as will hereafter be more fully described, and the ports 38, 40 enter the chamber 42 tangentially and in opposite directions.

In accordance with well-known principles, water entering the inlet 26 and flowing through the convergent portion 30 of the nozzle will tend to form a laminar stream as it leaves the low-pressure point 32. The laminar stream thus formed will tend to cling either to the outer wall of the discharge port 38 or the outer wall of the discharge port 40, thus creating a bistable element whereby the stream will continue to flow along a particular wall unless directed to the opposite wall by an outside force. Thus the water stream flowing through the port or passage 38 is directed against the vanes 46 of the turbine wheel 44 to drive the wheel in either a clockwise or counterclockwise direction depending on which direction the stream of water in the nozzle chooses to take and consequently through which of the ports 38, 40 it enters the annular chamber 42. Extending laterally in opposite directions from the narrow portion 32 of the nozzle formed by the conduit 30, 32, 34 are a pair of passages 48, 50 which terminate in ports 52, 54 respectively. Water at service pressure introduced at one of these ports will cause the flow of water through the conduit 30 to be directed against the opposite wall as it leaves the low-pressure area 32 and proceeds along the divergent portion 34 of the nozzle. For example, pressure introduced at port 52 in FIG. 3 will direct the flow of water through the divergent portion 34 of the nozzle against the wall 56 and thus through the discharge port 38 as indicated by the arrow, thereby causing the turbine wheel 44 to rotate in a clockwise direction.

Figure 4:
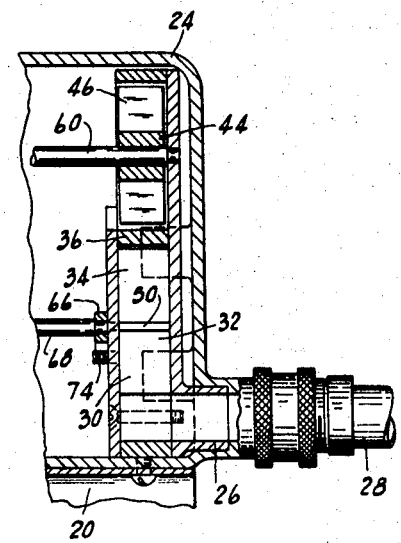
FIG. 4 is a fragmentary transverse section taken along the line 4—4 of FIG. 3.
Figure 5:
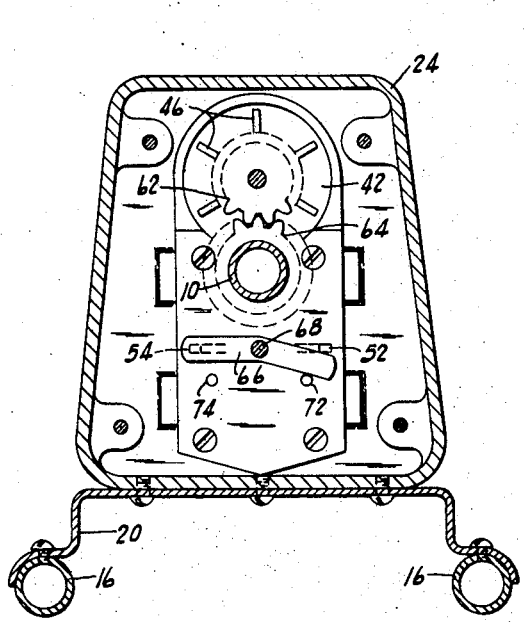
FIG. 5 is another transverse section through the fluid motor taken generally along the line 5—5 of FIG. 2.
Figure 6:
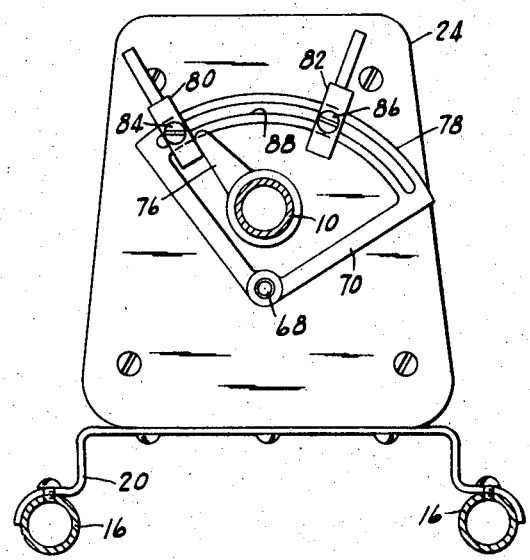
FIG. 6 is a sectional view through the sprinkler taken along the line 6—6 of FIG. 2.

The turbine wheel 44 is keyed to an output shaft 60 which terminates in a drive gear 62, see FIGS. 4 and 5. The teeth of the drive gear 62 mesh with the teeth of a gear 64 which is keyed to the fluid-distributing tube 10, and while in practice there is a reduction between these gears, they are shown in simple one-to-one ratio form for purposes of illustration. As indicated, the gear 64 is attached to the water supply tube 10 and accordingly drives this tube in a direction opposite to that of the output shaft 10.

For the purposes of controlling flow of pressurized fluid through the nozzle 30, 32, 34 and through one or the other of the discharge ports 38, 40, a valve 66 is provided. The valve 66 is in the form of an elongated slightly curved plate and is attached or keyed to a shaft 68 of an actuating member 70 which may conveniently be in the form of a quadrant. As the valve 66 is rocked on its pivot shaft 68, it will alternately close the ports 52, 54 to thereby cause the laminar stream of fluid to flow through one or the other of the discharge ports 38, 40, as shown, the travel of the valve 66 being limited or restricted by a pair of stops 72, 74. Thus, when the motor is in operation with service pressure available in hose 28 and inlet 26, the unit will operate as above described with the direction of rotation of the turbine wheel 44 and consequently the water supply and/or distributing tube 10 being governed by the position of the valve 66 which will allow either the port 52 or the port 54 to receive pressure.

As shown, the water supply and/or distributing tube 10 and the quadrant shaft 68 both extend through the main motor housing 24 which is otherwise sealed and watertight and which, as previously described, is under service pressure introduced at the coupling between the hose 28 and inlet 26. Attached to the water supply and distributing tube 10 for movement therewith is a flipper finger 76, the finger 76 being aligned with the supply jets or orifices 18 drilled into the tube 10. Since the quadrant 70 is attached to the quadrant shaft 68, the valve 66 will be swung from one position to the other as the quadrant and shaft 68 are rotated. The upper arcuate portion 78 of the quadrant 70 carries a pair of adjustable abutments 80, 82 which can be manually displaced to any point along the arcuate member 78 but which will remain fixed in position as by means of adjustment screws 84, 86 respectively, operating in an arcuate slot 88 formed in the portion 78 of quadrant 70. As shown, the abutments 80, 82 trap the end of the flipper finger 76 between them so that as the water-distributing tube 10 rotates, the flipper finger 76 will strike one of the abutments 80, 82, thereby displacing the abutment and pivoting the quadrant 70 to swing the quadrant shaft 68 and, consequently, the valve 66 carried thereby.

Figure 3:
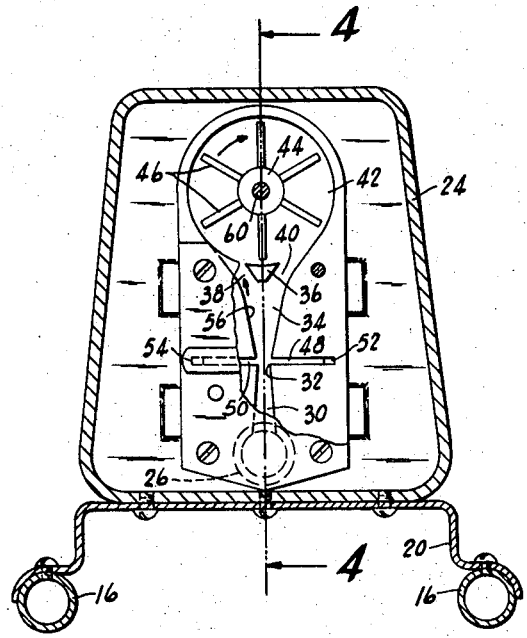
FIG. 3 is a transverse section through the fluid motor taken generally along the line 3—3 of FIG. 2 but with portions broken away to reveal normally concealed structure.

It is thus apparent that with the valve 66 in the position shown in FIGS. 3 and 5 and with service water pressure on, the water will flow through the port 52 to point 32 in the nozzle of the fluid motor where it directs the water stream from conduit 30 and causes the same to flow along the wall 56 of nozzle portion 34 thereby causing clockwise rotation of the turbine wheel 44 as above described. This motion, through the gears 62, 64, causes the water-distributing tube 10 to rotate slowly in a counterclockwise direction carrying the flipper finger 76 with it and causing the finger to strike the left abutment 80 pivoting the quadrant 70 and quadrant shaft sufficiently to close the port 52 and open the port 54, the turbine wheel 44 will immediately reverse its direction of rotation and will cause the water-distributing tube 10 to rotate clockwise until the flipper finger 76 contacts the right abutment 82, thereby shifting the quadrant 70 to the right and similarly rocking the valve 66 to again reverse the motor.

It has been found that the improved mechanism is extremely efficient in the operation of a lawn sprinkler of the oscillatory type, and the water tube 10 of the lawn sprinkler is moved with a uniform angular velocity and is moreover instantly reversed at the end of its travel, thereby causing the sprinkler to distribute water uniformly over the ground within the area being sprinkled. The size of the area covered can be regulated through the adjustment of the abutments 80, 82 in an obvious manner, and the control ports 52, 54 are automatically alternately opened and closed by the swinging of the valve 66 which is directly responsive to the movement and position of the water-distributing tube. The abutments 80, 82 can be moved to any convenient and desired position regardless of the location of the flipper finger 76 due to the provision of a clutching device, located between the flipper finger and the drive gear 62 but not shown, which allows the distributing tube 10 and the flipper 76 to be rotated while the drive gear remains stationary, and this friction clutch also serves as a safety device in the coupling mechanism.

Various modes of carrying out the invention are contemplated as being within the scope of the following claims particularly pointing out and distinctly claiming the subject matter which is regarded as the invention.

We claim:

1. A lawn sprinkler, comprising, a rotatably mounted fluid-distributing tube having a finger swingable through an arcuate path, a fluid motor mounted adjacent said tube, said motor including a fluid-driven wheel, conduit means communicating with said wheel for conducting fluid under pressure thereto, means coupling said wheel to said distributing tube for transmitting rotary motion thereto, valve means for controlling flow of fluid through said conduit for driving said wheel alternately in opposite directions, said valve means including a rotatably mounted flow control member having a pair of spaced abutments located in the path of said finger for alternate contact thereby so as to be responsive to the movement of said distributing tube for alternately swinging said flow control member from one control position to another.

2. A lawn sprinkler according to claim 1, wherein at least one of the abutments is adjustable toward and away from the other abutment in the path of movement of the finger.

3. A lawn sprinkler according to claim 1, wherein the abutments are carried by an arcuate member mounted on the flow control member for movement therewith.

4. A lawn sprinkler according to claim 1, wherein the flow control member includes a rotatable shaft and a quadrant mounted on the shaft and carrying the abutment.

5. A lawn sprinkler according to claim 4, wherein the flow control member is in the nature of a plate also mounted on the quadrant shaft and swingable therewith.

6. A lawn sprinkler according to claim 5, wherein a pair of stops are provided for limiting swinging movement of the flow control member.